United States Patent
Eberspächer et al.

[11] Patent Number: 6,016,035
[45] Date of Patent: Jan. 18, 2000

[54] LIGHT ASSEMBLY, PREFERABLY TAIL LIGHT ASSEMBLY, OF A VEHICLE, PREFERABLY A MOTOR VEHICLE

[75] Inventors: Helmut Eberspächer, Esslingen; Winfried Hardy Gauch, Magstadt; Helmut Haf, Schwaikheim; Wolfgang Robel, Filderstadt-Sielmingen, all of Germany

[73] Assignee: Reitter & Schefenacker GmbH & Co. KG, Germany

[21] Appl. No.: 09/059,059

[22] Filed: Apr. 10, 1998

[30] Foreign Application Priority Data

Apr. 10, 1997 [DE] Germany .......................... 197 14 849

[51] Int. Cl.⁷ .................................................. H05B 37/02
[52] U.S. Cl. .......................... 315/82; 307/10.8; 315/156; 315/158
[58] Field of Search .................... 315/82, 159, 156, 315/158, 53, 56, 71; 307/10.8; 250/205

[56] References Cited

U.S. PATENT DOCUMENTS

| | | | |
|---|---|---|---|
| 2,827,594 | 3/1958 | Rabinow | 315/82 |
| 2,944,188 | 7/1960 | Lohr et al. | 315/159 |
| 4,211,955 | 7/1980 | Ray | 315/53 |
| 4,665,321 | 5/1987 | Chang et al. | 315/82 |
| 4,727,289 | 2/1988 | Uchida | 315/71 |
| 4,841,198 | 6/1989 | Wihelm | 315/82 |

*Primary Examiner*—Michael B Shingleton
*Attorney, Agent, or Firm*—Robert W. Becker & Associates

[57] ABSTRACT

A light assembly for a motor vehicle has at least one light source connected to a circuit, wherein the at least one light source has a light output that is adjustable according to external light conditions in order to prevent blinding of the driver in a following vehicle and in order to ensure proper light intensity during daytime operation.

15 Claims, 5 Drawing Sheets

LIGHT ASSEMBLY, PREFERABLY TAIL LIGHT ASSEMBLY, OF A VEHICLE, PREFERABLY A MOTOR VEHICLE

BACKGROUND OF THE INVENTION

The present invention relates to a light assembly, preferably a tail light assembly, of a vehicle such as a motor vehicle comprising at least one light source connected to a circuit.

The light source in the tail light assembly of a motor vehicle, such as a brake light or the turn signal light, have the same luminance during day and night. When bright sunlight hits the tail light assembly of the motor vehicle, the turn signal or brake lights of the tail light assembly can be seen only with difficulty or not at all. On the other hand, it is possible that when driving at night the driver of a following vehicle is blinded by the tail light assembly of the vehicle in front of him.

It is therefore an object of the present invention to improve the light assembly of the aforementioned kind such that their light sources can be clearly detected without blinding the driver of the following vehicle.

SUMMARY OF THE INVENTION

The inventive light assembly for vehicle according to the present invention comprises at least one light source connected to a circuit, wherein the at least one light source has a light output or brightness (luminance) adjustable according to external light conditions.

Preferably, the circuit comprises a light switch, wherein the light output of the at least one light source is adjusted by selecting a position of the light switch.

Advantageously, the circuit comprises a master controller for controlling the at least one light source.

The master controller comprises at least one dimmer for regulating the light output of the at least one light source.

The at least one dimmer is bridged for increasing the light output of the at least one light source.

The circuit includes at least one first switch in parallel to the at least one dimmer and a second switch, connected by an electric line to the at least one light source, wherein the at least one first switch is located in the electric line connecting the second switch and the at least one light source.

The circuit also may comprise a slave controller connected downstream of the master controller.

The slave controller preferably controls at least one light source of a second light assembly.

The at least one light source may be a brake light that is preferably comprised of LEDs.

Advantageously, the at least one light source is a turn signal light that is preferably comprised of LEDs.

The light assembly may further comprise an electrochromic interior rear mirror having a sensor circuit, wherein that at least one light source is a fog tail light wherein the fog tail light is connected to the sensor circuit and wherein the sensor circuit reduces the light output when a vehicle approaches from behind.

The fog tail light may be turned off when the vehicle is approaching from behind.

Advantageously, the light assembly further comprises a comparator circuit, wherein the sensor circuit is connected to the comparator circuit for comparing the actual value emitted by the electrochromic mirror to a reference value.

The comparator circuit comprises a comparator and the output signal of the comparator is used to control the fog tail light.

The circuit may comprise a flip-flop switch connected downstream of the comparator wherein the flip-flop switch turns on and off the fog tail light according to the output signal of the compurator.

Preferably, the circuit comprises at least one switch for switching the fog tail light on or off wherein the flip-flop actuates the at least one switch.

The luminance or the light output of the light source in the inventive light assembly is adjusted as a function of the external light conditions. When driving during daytime, the light output of the light source can be increased so the light source is easily visible when bright sunlight impinges on the light assembly.

Despite the increased light output (luminance) when driving during the day, blinding of the driver of a following vehicle is not possible. When driving at night, the light output or luminance of the light source can be reduced without there being the risk that the light source when actuated is no longer visible. On the other hand, the reduced light output ensures that the driver of the following vehicle is not blinded.

In one light assembly according to the present invention, the light output of the fog tail light is controlled by the sensor circuit of an electrochromic interior rearview mirror of the vehicle. When the fog tail light is turned on and radiates at high luminance, the sensor circuit of the electrochromic interior rearview mirror detects the light emitted by the headlights of following vehicle impinging on the rearview mirror. The signals emitted by the sensor circuit of the interior rearview mirror are detected and evaluated and are used to reduce the luminance of the fog tail light, preferably are used to turn off the fog tail light. This ensures that the driver of the following vehicle is not blinded by the fog tail light. When the following vehicle has again a greater distance to the vehicle in front or has passed the vehicle in front, less light or no light impingings on the interior rearview mirror. The corresponding signals of the sensor circuit of the interior rearview mirror are detected, evaluated and then used to turn the fog tail light on again.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
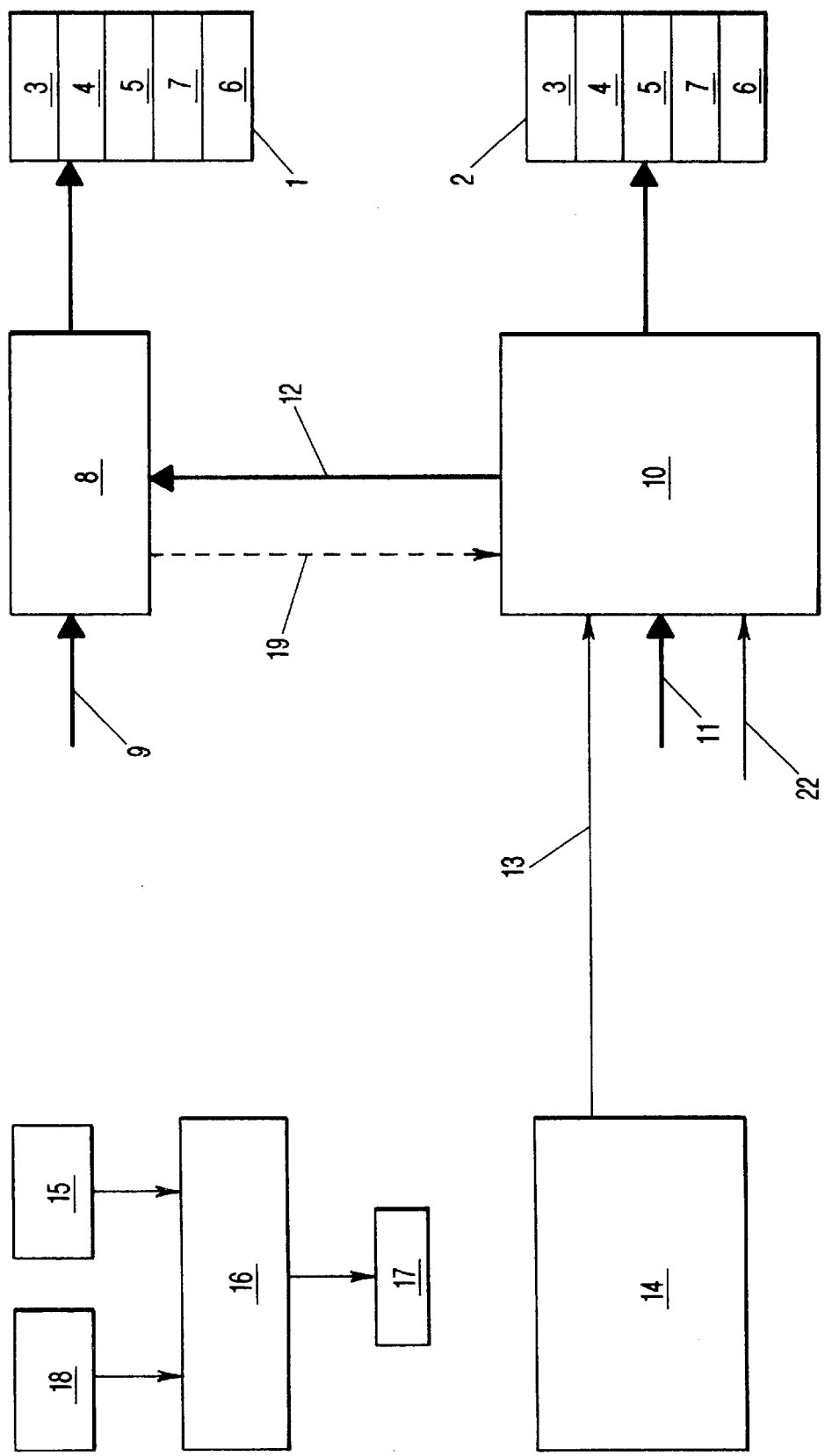
FIG. 1 is a schematic representation of a circuit for controlling the light sources of a tail light assembly of a motor vehicle.

The present invention will now be described in detail with the aid of several specific embodiments utilizing FIGS. 1 through 5.

The non-represented vehicle has two tail light assemblies 1 and 2 which are provided with different kinds of light sources such as incandescent lamps, neon lamps or LEDs. The right and the left tail light assembly 1 and 2 have respectively a brake light 3, a turn signal light 4, a reflector 5, a tail light 6 as well as a fog tail light 7. The different light sources 3 through 7 of the right tail light assembly 1 are controlled by a slave controller 8. It is connected by cable (electric line) 9 to the current supply of the vehicle. The slave control 8 is controlled by a master control unit 10 which is also connected by cable (electric line)11 to the current supply of the vehicle. The master controller 10 controls the light sources 3 through 7 of the tail light assembly 2. The master controller controls the level of luminance of the brake light 3 and the turn signal light 4 as well as the blinking frequency of the turn signal light 4 of the tail light assembly 2. Control lines 12 supply signals of the master controller 10 to the slave controller 8 in order to also control the luminance of the brake light 3, the turn signal light 4 as well as its blinking frequency within the right tail light assembly 1. This ensures that the corresponding light sources of the right and left tail light assemblies 1, 2 have the same luminance.

The master controller 10 is supplied by signal line 13 with signals of an electrochromic mirror (EC mirror) 14 which is provided in the vehicle as an interior rearview mirror. The EC mirror 14 has connected thereto a controller which, as a function of the light impinging on the interior rearview mirror by vehicles following the vehicle sends respective signals via signal line 13 to the master controller 10. Furthermore, the EC mirror 14 has a switch arranged thereat with which the fog tail light 7 can be turned off.

The vehicle comprises a fog tail light switch 15 with which the driver can turn on the fog tail light 7 when needed. This switch 15 is connected to a warning circuit 16 which provides a signal to a warning unit 17. A speed circuit 18 is also connected to the warning circuit 16. It monitors the driving speed of the vehicle. When the fog tail light 7 is turned on, the vehicle velocity may not exceed 50 km/h. When the velocity has been surpassed, the speed circuit 18 will send a corresponding signal to the warning circuit 16 which then actuates the warning unit 17 and indicates to the driver that the allowable driving speed for a turned-on fog tail light 7 has been surpassed. The warning unit 17 is advantageously a speaker which provides a corresponding acoustic signal. The warning unit 17 can also be an optical display which can be used alone or in combination with an acoustic signal.

The slave controller 8 is connected by a redundancy line 19 to the master controllers 10. The redundancy line 19 ensures that in the case that the level for the luminance of the turn signal light within the master controller 10 is defective, the slave controlled unit 8 takes over control of the turn signal light 4 of the tail light assembly 2.

The fog tail light 7 is automatically switched off by the sensor circuit of the EC mirror 14. When the light emitted by a following vehicle impingings on the EC mirror 14, the sensor circuit of the EC mirror 14 will generate a corresponding switching signal that is supplied via the signal line 13 to the master controller 10. It processes this signal and turns off the fog tail light 7. This ensures that the driver of the following vehicle is not blinded by the fog tail light 7. As soon as the following vehicle has passed the vehicle in front or has again a greater distance to it, the light impinging on the EC mirror 14 is much reduced or no light impinging at all, so that the master controller 10 receives via the signal line 13 a respective signal that is processed within the master controller 10 so that the fog tail light 7 is automatically switched on. For the automatic turning off of the fog tail light 7 it is not required that the driver actuates the fog tai light switch 15 in the vehicle.

Figure 2:
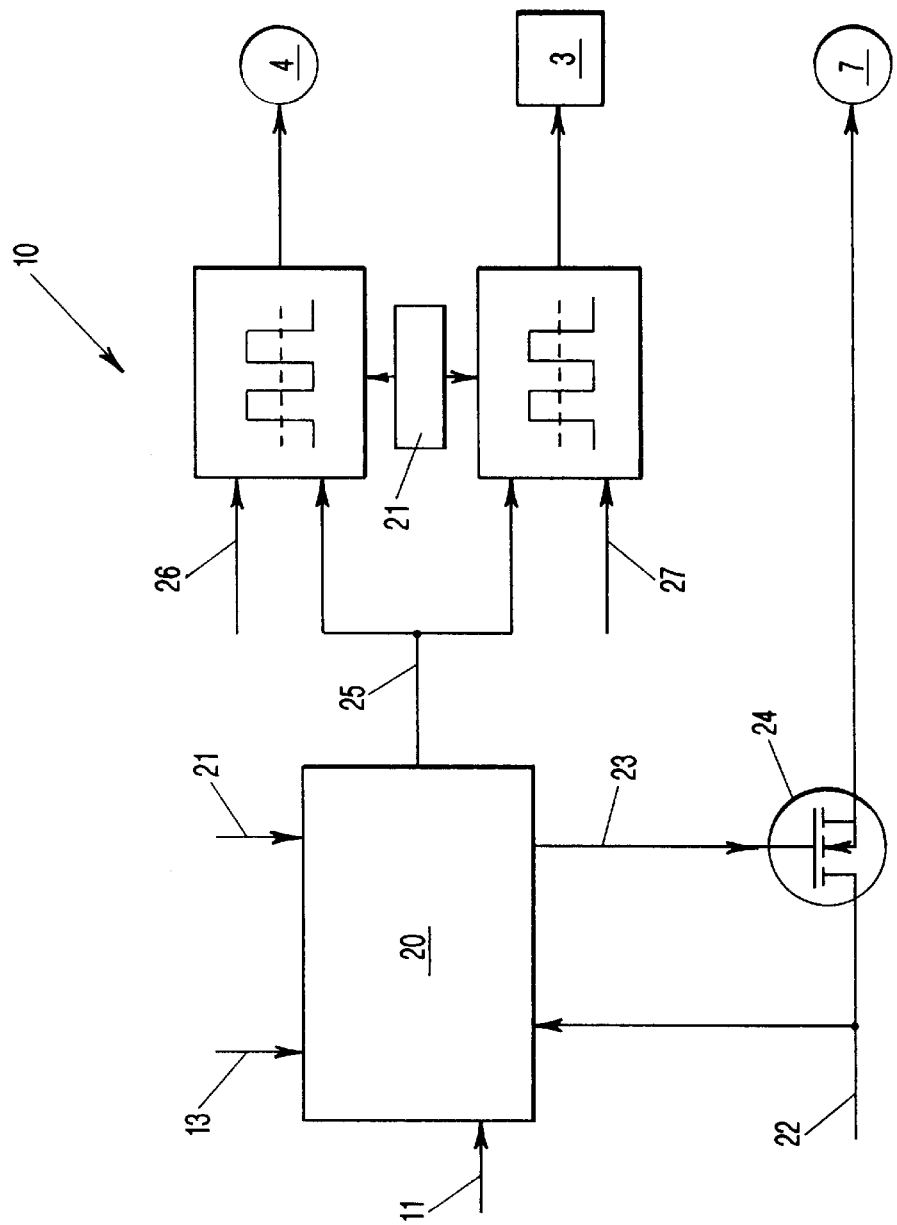
FIG. 2 is a schematic representation showing as a block diagram a portion of the circuit according to FIG. 1.

As is shown in FIG. 2, the master control unit 10 has a logic circuit 20 which is connected to a power supply 21 of the vehicle. It ensures the current/voltage supply of the logic circuit 20. The logic circuit 20 is supplied with a signal by line 11 which is connected to the light switch of the vehicle. Furthermore, a Δ EC signal of a Δ EC switching circuit within the EC mirror 14 (FIG. 1) is supplied via line 13 to the logic circuit. The formation of the Δ EC signal will be explained in the following with the aid of FIG. 3. Furthermore, the logic circuit 20 is supplied with the signal from the switch of the fog tail light 7 via line 22.

The logic circuit 20 controls via line 23 an output switch 24 with which the fog tail light 7 is automatically turned on and off. The output switch 24 can be a relay, an electronic component etc. The signal supplied via line 22 is evaluated within the logic circuit 20. It emits via line 13 a corresponding signal to the output switch. When the fog tail light 7 is switched on and when a vehicle is closing in from behind, then, as disclosed above, the light emitted by the following vehicle impinges on the EC mirror 14. Its sensor circuit detects this impinging light, evaluates, and sends via line 13 a corresponding signal to the logic circuit 20 of the master controller 10. The logic circuit 20 actuates the output switch 24 via line 23 so that the fog tail light 7 is switched off. As soon as no light is impinging on the EC mirror 14, respectively, the intensity of the light has fallen below a certain level, this is detected by the sensor circuit of the EC mirror 14. It sends via line 13 a corresponding signal to the logic circuit 20 in which the signal is evaluated. The logic circuit 20 actuates the output switch 24 so that the fog tail light 7 is automatically turned on.

The logic circuit 20 is also used for operating the brake light 3 and a turn signal light 4 with two different light intensities. When the vehicle is driven during the day and the light switch of the vehicle is not switched on, the brake light 3 and the turn signal light 4 are operated with increased light intensity (daytime position). When the vehicle is driven at night and the light switch of the vehicle is turned on, a reduced luminance of the brake light 3 and turn signal light 4 is sufficient. Via line 11 the logic circuit 20 is supplied as a function of the position of the light switch with the corresponding signal. Accordingly, the received signals are evaluated by the logic circuit 20. At the terminal 25, as a function of the position of the light switch, a low or high signal is provided. A low signal is generated for example when the light switch of the vehicle is switched on. In this case it is sufficient to operate the brake light 3 and the turn signal 4 with a reduced light intensity. When the light switch, however, is not switched on, the terminal 25 of the logic component 20 provides a high signal, so that the brake light and the turn signal light 4 are operated at a higher luminance. An automatic adaption of the light output to day and night operation is thus possible. As shown in FIG. 2, the turn signal light 4 may have a light source in the form of an incandescent lamp, while the brake light 3 may be provided with a light source in the form of LEDs. Of course, it is also possible to employ for the brake light 3 at least one incandescent light bulb and to use alternatively for the turn signal light LEDs. It is also possible to mix both for one particular light.

The level of the low and high signals can advantageously be adjusted with respect to the type of vehicle. Corresponding control signals 26 and 27 are provided for this purpose.

Figure 4:
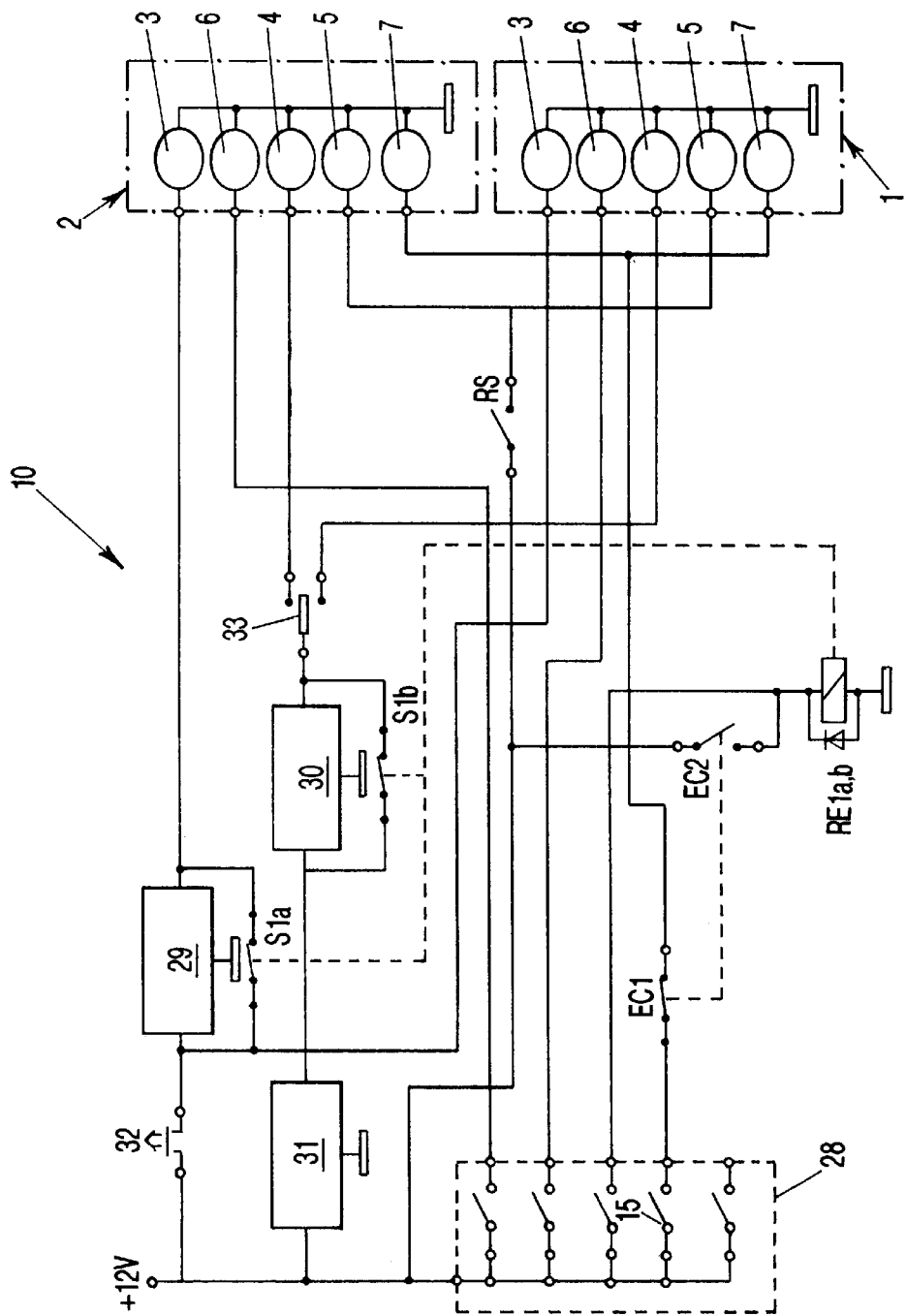
FIG. 4 shows a diagram of the circuit according to FIG. 2.

The disclosed control of the individual light source functions is advantageously provided by a pulse width modulation (FIG. 4) or by a distributed current control or by a sum current control. FIG. 4 shows the two level switching of master control unit 10 with which the light sources of the two tail light assemblies 1 and 2 are actuated in the manner disclosed. The brake light 3 of the two tail light assemblies 1, 2 is embodied by LEDs, while the tail light 6, the turn signal light 4, the reflector 5, and the fog tail light 7 of the two light assemblies 1, 2 are embodied as incandescent light bulbs. The two light assemblies 1,2 are actuated by a switch 28 which in the shown embodiment is a turn knob. For the brake light 3 and the turn signal light 4 a respective pulse width modulation-operated dimmer 29, 30 is provided which is positioned in the connection of switches 32, 33 to the light sources 3 and 4. The master controller 10 is provided with a turn signal controller 31 for the turn signal light 4.

Parallel to the dimmers 29, 30 a switch a, S1a, S1b is provided. When these switches are closed, the respective dimmer 29, 30 is bridged. The fog tail light 7 is connected via a switch EC1 to the switch 28. When the switch EC1 is open, the fog tail light 7 is turned off. In the connecting line between the vehicle voltage supply to the dimmer 29, a switch 32 is positioned which is coupled to the brake of the vehicle. When the brake is actuated, the switch 32 is closed so that the brake light 3 is illuminated.

When the vehicle is operated during the day, the light switch 28 is switched off. In this case, the switches S1a, S2a are closed so that the dimmer 29, 30 is bridged. When the brake or the turn signal of the vehicle is actuated, the brake light 3 or the turn signal light 4 will be illuminated at high luminance. When the vehicle is driven by night, the switch 28 switches on the vehicle lights. This results in th e two switches S1a, S1b being opened. Via the dimmers 29, 30 the brake light 3 and the turn signal light 4 are operated at reduced voltage, respectively, reduced current so that they will be illuminated at a reduced luminance. The control of the individual control lamp functions within the dimmers 29, 30 is realized by a pulse width modulation.

The switches EC1 and EC2 are switched by the sensor circuit of the EC mirror 14. The switch EC1 is positioned between the switch 28 and the fog tail light 7 in series. When the fog tail light 7 is switched on the by switch 28, the fog tail light 7 is automatically turned off in the aforementioned manner when a vehicle follows from behind and emits light. The emitted light is received by the EC mirror 14 which evaluate the received light signals of the following vehicles in the afordescribed manner. With a corresponding switching signal, the switch EC1 is opened and the fog tail light 7 is switched off.

Figure 3:
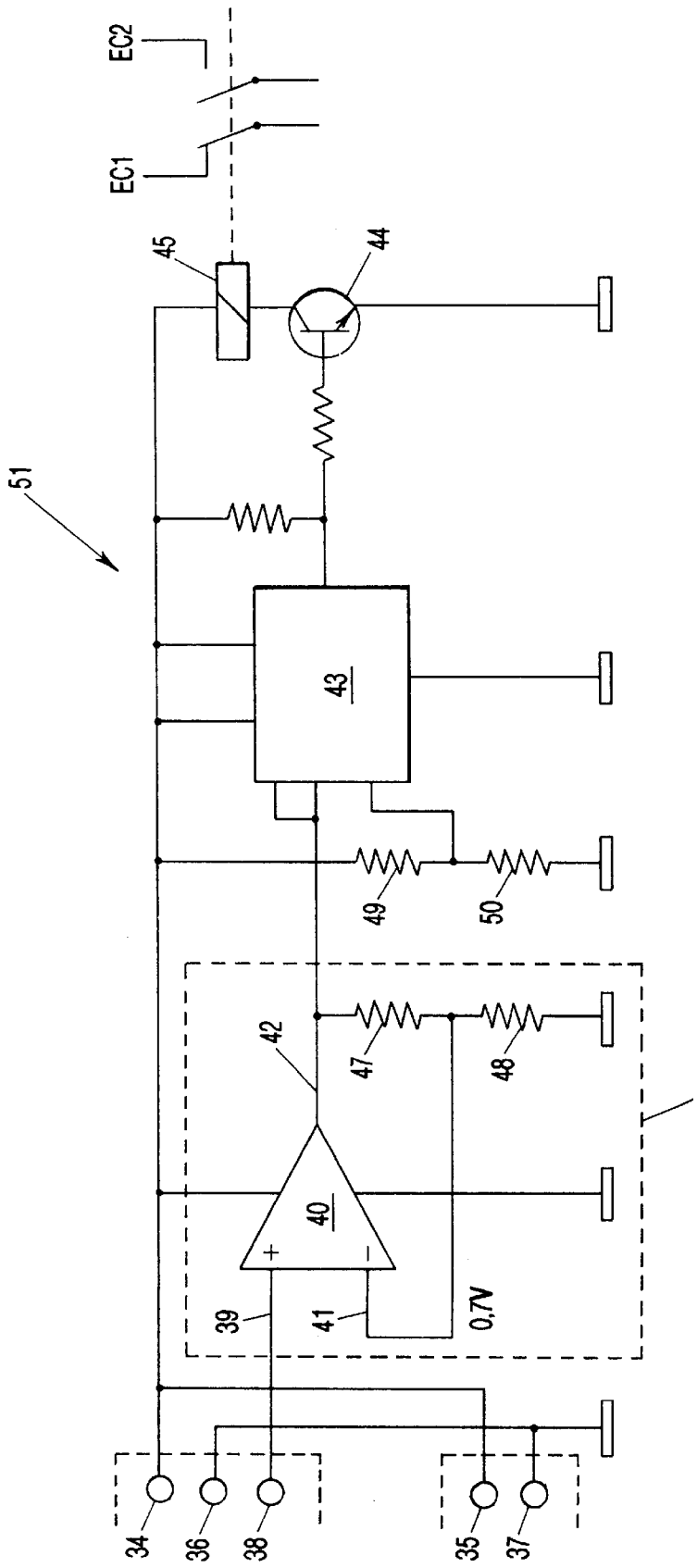
FIG. 3 shows a circuit diagram of an EC adaptor of the circuit of FIG. 1.

FIG. 3 shows an EC adaptor 51 which is a component of the sensor circuit of the EC mirror 14 and with which by differentiation the fog tail light 7 is automatically switched off. The circuit of the EC adaptor 51 is connected to the current/voltage supply (power supply) of the vehicle. To the terminal 34, 35 a voltage of 13.5 V is supplied. The connectors 36, 37 are grounded. Via the connector 38 the EC adaptor 51 receives a signal of the EC mirror 14, respectively, of its sensor circuit. This EC signal is supplied to the terminal 39 of the comparator 40. It compares this signal with a reference signal supplied via terminal 41. The output 42 of the comparator 40 thus provides a differential signal that is supplied to the flip flop 43. Downstream of the flip-flop, a transistor 44 is arranged with which a relay 45 for actuating the switches EC1 and EC2 is actuated. The terminal 41 of the comparator 40 is part of a comparator circuit 46 which comprises serially connected resistors 47, 48, 49, 50. The resistor 47, 48 are switched in parallel to the resistors 49, 50. The resistor values are selected such that at the terminal 41 two different voltage signals are supplied which in the embodiment are, for example, 0.3 V and 0.7 V. The flip-flop 43 is designed such that for a voltage of 0.7 V a signal is emitted. In the voltage range between 0.3 V and 0.7 V the flip flop 43 maintains the signal, while at voltage values of less than 0.3 V no signal is emitted. Accordingly, the transistor 44 arranged downstream switches the relay 45 for actuating the switches EC1 and EC2. The given voltage values, of course, can be different. The two voltage values represent the two different switching levels with which the brake 3 and the turn signal light 4 are switched between the bright and dimmed operation so that they can operate at two different luminance values. With this differentiation the brake light and the turn signal light 4 are supplied with the required voltage so that, depending on the external light conditions, they emit light of different intensity. When driving at daytime, the brake light 3 and the turn signal light 4 are operated at greater light intensity then when driving at night.

The switch EC2 is, for example, operative when the vehicle drives into a tunnel and is illuminated from behind by a vehicle. In this case, the EC mirror is illuminated with more light from behind than from the front so that via connector 38 a corresponding EC signal is supplied to the terminal 39 of the comparator 40. The EC adaptor 51 closes the switch EC2 so that the relay RE1a,b (FIG. 4) arranged downstream is actuated and the switch is S1a, S1b are opened. The dimmers 29, 30 are thus switched into the current path to the brake light 3 and to the turn signal light 4 so that is ensured that they operate with reduced light intensity. Thus, blinding of the driver in the following vehicle by intensely illuminated braking and turn signal lights is reliably prevented. As soon as the vehicles leaves the tunnel, the sensor circuit of the EC mirror 14, due to the more intense light impinging from the front, will send a respective signal to the terminal 39 of the comparator 40 which is processed within the EC adaptor 51 and is used for opening the switch EC2. The relay RE1a, 1b thus is released so that the switches S1a, S1b are closed. The two dimmers 29, 30 are thus bridged so that the brake light 3 and the turns signal light 4 are again illuminated at greater light output.

Figure 5:
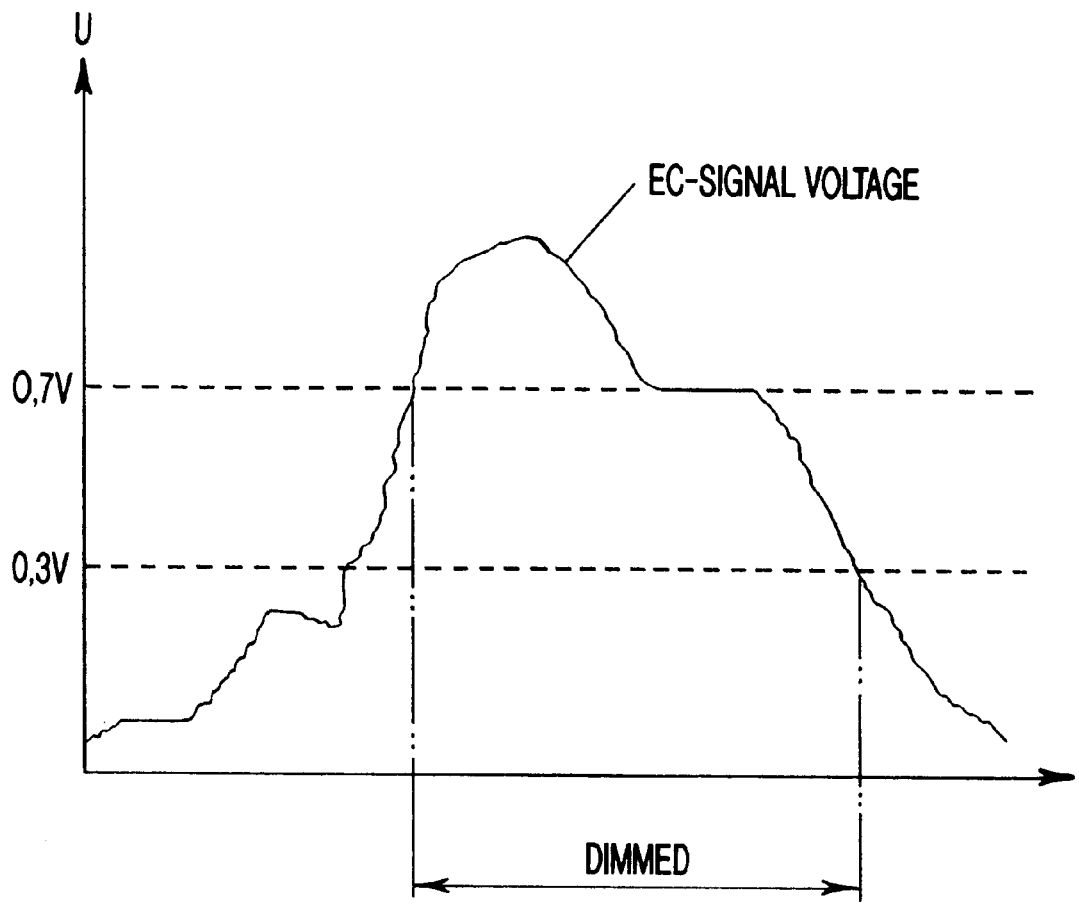
FIG. 5 shows of the EC signal voltage as a function of the supplied voltage and time.

FIG. 5 shows in an exemplary manner the course of the EC signal voltage as a function of time t. The two voltage levels of 0.3 V and 0.7 V represent the low and the high signals. As long as the EC signal voltage has a voltage value below 0.3 V, the fog tail light 7 is switched on. This is the case, as disclosed above, during normal operation when no vehicle follows. However, as soon as a vehicle approaches from behind and the light emitted by its headlights impinges on EC mirror 14 the EC signal voltage increases. As soon as a value of more than 0.7 V is reached, in the manner disclosed above, the fog tail light 7 is automatically switched off so that the driver of the following vehicle will not be blinded by the fog tail light. The fog tail light 7 remains switched off until the value of the EC signal voltage will fall below 0.3 V. Only then, the fog tail light 7 is automatically switched on in the manner disclosed above. The master and slave controllers 10, 8 can be provided with so-called failsafe circuits. When a disruption in the switching or a failure of the switch occurs, the circuit is switched to a low level state so that the brake light 3 and the tail light 4 will be illuminated at reduced light output. This ensures in any situation that the driver of a following vehicle cannot be blinded by these lights. Via a further sensor within the EC mirror 14, an automatic operation of the light switch (day/night) is reliably ensured. Instead of the disclosed pulse width modulation the control of the individual lamp functions can also be realized by resistance switching, by a sum current control or is especially also via distributed current controllers.

The specification incorporates by reference the disclosure of German priority document 197 14 849.2 of Apr. 10, 1997.

The present invention is, of course, in no way restricted to the specific disclosure of the specification and drawings, but also encompasses any modifications within the scope of the appended claims.

What is claimed is:

1. A light assembly for a vehicle comprising:
   at least one light source connected to a circuit, wherein said at least one light source has a light output adjustable according to external light conditions;
   wherein said circuit comprises a light switch, wherein the light output of said at least one light source is adjusted according to a selected position of said light switch;
   wherein said circuit further comprises first switches positioned in electrical lines connecting said light switch to said at least one light source;
   wherein each one of said first switches has a parallel-switched dimmer for reducing light output of said at least one light source;
   wherein said light switch and said first switches are connected such that when said light switch is switched on, said first switches are open and when said light switch is turned off, said first switches are closed;
   wherein said first switches, when closed, bridge said dimmers to increase the light output.

2. A light assembly according to claim 1, wherein said circuit comprises a master controller 10 for controlling said at least one light source.

3. A light assembly according to claim 2, wherein said dimmers are components of said master controller.

4. A light assembly according to claim 1, wherein said circuit comprises a second switch connected in said electric line to said at least one light source.

5. A light assembly according to claim 2, wherein said circuit comprises a slave controller connected downstream of said master controller.

6. A light assembly according to claim 5, wherein said slave controller controls at least one light source of a second light assembly.

7. A light assembly according to claim 1, wherein said at least one light source is a brake light.

8. A light assembly according to claim 7, wherein said brake light is comprised of LEDs.

9. A light assembly according to claim 1, wherein said at least one light source is a turn signal light.

10. A light assembly according to claim 9, wherein said turn signal light is comprised of LEDs.

11. A light assembly comprising:
    at least one fog tail light connected to a circuit;
    a switch for switching on and off said at least one fog tail light;
    an electrochromic interior rearview mirror having a sensor circuit connected to an EC adaptor, wherein said at least one fog tail light is connected to said sensor circuit;
    said EC adaptor having a comparator circuit, wherein said sensor circuit is connected to said comparator circuit and wherein said sensor circuit sends an actual value emitted by said electrochromic mirror to said comparator circuit for comparing to a reference value;
    wherein an output signal of said comparator is sent to at least one control switch for switching on and off said at least one fog tail light, wherein said control switch is serially connected between said manual switch and said fog tail light.

12. A light assembly according to claim 11, wherein said fog tail light is turned off when a vehicle is approaching from behind.

13. A light assembly according to claim 11, wherein said comparator circuit comprises a comparator.

14. A light assembly according to claim 11, wherein said control switch is a flip-flop switch connected downstream of said comparator, wherein said flip-flop switch turns on and off said fog tail light according to said output signal of said comparator.

15. A light assembly according to claim 14, wherein said switch for switching said fog tail light on or off is activated by said flip-flop switch.

* * * * *